United States Patent
Smyth et al.

(10) Patent No.: US 9,720,566 B1
(45) Date of Patent: Aug. 1, 2017

(54) MANAGEMENT OF USER INTERFACE ELEMENTS

(71) Applicant: Inkling Systems, Inc., San Francisco, CA (US)

(72) Inventors: Logan Falconer Smyth, San Francisco, CA (US); Olof Alexander Mathé, San Francisco, CA (US); Chanpory Rith, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 305 days.

(21) Appl. No.: 14/079,478

(22) Filed: Nov. 13, 2013

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
None
See application file for complete search history.

(56) References Cited

U.S. PATENT DOCUMENTS

| | | | |
|---|---|---|---|
| 2005/0160359 A1* | 7/2005 | Falk | G06F 17/227 715/239 |
| 2005/0289478 A1* | 12/2005 | Landman | G06F 3/048 715/804 |
| 2008/0184159 A1* | 7/2008 | Selig | G06F 17/243 715/781 |

* cited by examiner

*Primary Examiner* — William Trapanese
(74) *Attorney, Agent, or Firm* — Ascenda Law Group, PC

(57) ABSTRACT

Embodiments are provided for managing user interface elements. In some embodiments, a first positioning of a user interface indicator is detected within a target region of a user interface, responsive to the first positioning, at least a portion of a user interface element is overlaid onto the user interface and at least one user interface control for receiving input on incorporation options for the user interface element into the user interface is presented, and the user interface is presented based on whether incorporation option input is received.

18 Claims, 13 Drawing Sheets

FIG. 10

FIG. 12
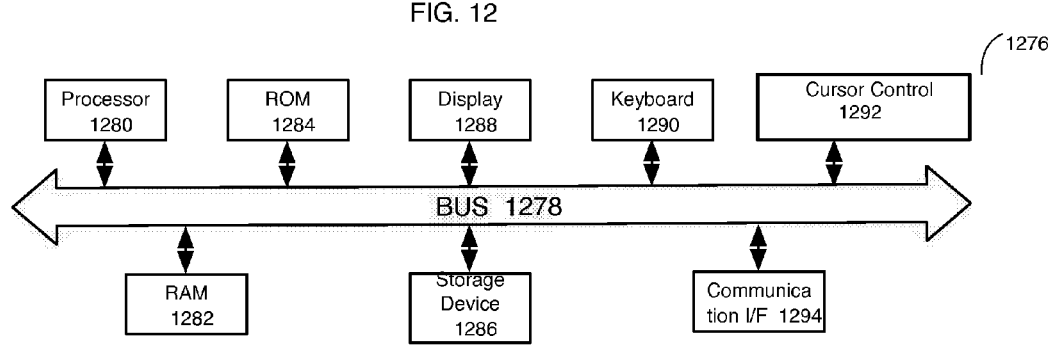
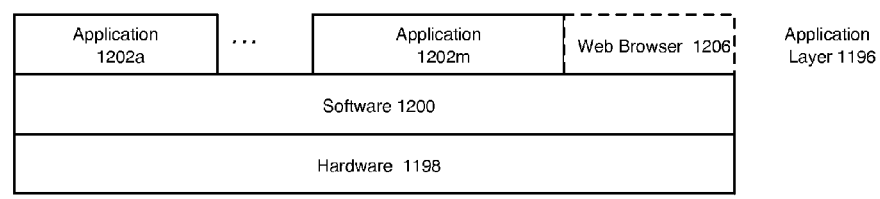
FIG. 13

MANAGEMENT OF USER INTERFACE ELEMENTS

FIELD OF THE INVENTION

Various embodiments relate to user interfaces and the management of user interface elements displayed on a display of an electronic device.

BACKGROUND

Displays on electronic devices, such as laptop computer screens, smartphones, tablet computers, and the like, have gradually shrunk in size over time along with the devices. As a result, space or "real estate" on the display for the user interface is at a premium, and determining what elements to display on the interface has become increasingly more important. Accordingly, providing users with more control over what is displayed within user interfaces on the display is desired.

SUMMARY

Embodiments are provided for managing user interface elements. In some embodiments, a first positioning of a user interface indicator is detected within a target region of a user interface, responsive to the first positioning, at least a portion of a user interface element is overlaid onto the user interface and at least one user interface control for receiving input on incorporation options for the user interface element into the user interface is presented, and the user interface is presented based on whether incorporation option input is received.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which:

FIG. 10 is an exemplary user interface for management of user interface elements in accordance with some embodiments of the invention;

FIG. 12 is an exemplary computer system in accordance with some embodiments of the invention; and FIG. 13 is an exemplary computer system in accordance with some embodiments of the invention.

DETAILED DESCRIPTION

Methods, computer-readable media, and systems for management of user interface elements for software tools, for example, desktop publishing tools, are provided. In some embodiments, receiving input to move a cursor or other user interface indicator element into a target region within a user interface may be detected and trigger the presentation of a user interface element and a user interface control for managing incorporation of the user interface element into the user interface. For example, moving a cursor into a target region of a user interface may trigger an overlay of the user interface element, such as a panel of a software tool user interface, onto the user interface, and the presentation of a user interface control along with the user interface element for management of the user interface element. The user interface control may be selected by the user to indicate that the panel should remain displayed and/or incorporated into the user interface after the cursor is moved from the target region and/or displayed panel.

Figure 1A:
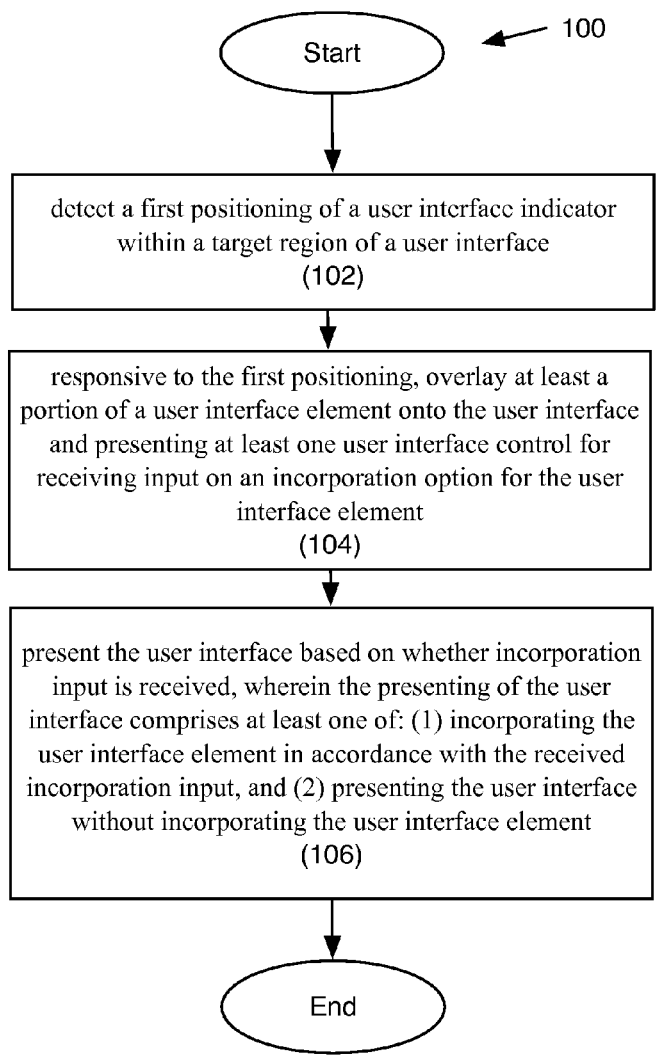
FIG. 1A is a flowchart depicting an exemplary process for management of user interface elements in accordance with some embodiments of the invention.

FIG. 1A is an exemplary flowchart depicting a process 100 for management of user interface elements in accordance with some embodiments of the invention. A first positioning of a user interface indicator within a target region is detected (102). The user interface indicator, such as a cursor, may visually indicate a location or position on a display and thereby allow the user to indicate a desired position on the display with the user interface indicator. The movement of the cursor or other user interface indicator element may be received as input with the use of an input device (e.g., a mouse, touch pad, keyboard, motion controller/detector, touch pad, etc.) and/or indicated on a touch screen of a device, and the input may cause the user interface indicator to enter and be positioned within a target region. For example, input of one or more movements with the input device may be received that are translated to position the cursor or other user interface indicator element within the target region on a display and the positioning/entry into the target region may be detected.

In another example, a user may direct the cursor or other visual user interface indicator with her/his finger and/or a stylus across a touch screen into the target region. In yet another example, a user may make a gesture, wave a hand, lift a finger, and/or any other movement by a person that may be detected by the input device (e.g., a motion controller/detector, etc.) and interpreted as a movement of a cursor or visual indicator from one part of the display to a target region of the user interface. A gesture may be any motion that may be made with one or more fingers on a touchscreen. A motion detector may be used to detect movements of a person's body (e.g., hand, finger, arm, etc.) and interpreted as input to direct a cursor or other visual user interface indicator.

In some embodiments, event listener functionality may be provided with the browser, the operating system, and/or any other software installed on a device and/or server to capture events. When input, such as movements of an input device and/or any other interactions with software, is received from the input device and event listeners are utilized, then the movement and/or other interactions as well as the location of the cursor may be captured, logged as events, and notice may be provided to listeners registered to receive notice of the occurrence of particular events. By way of example, an event listener application programming interface (API) may provide functionality for registering a listener to capture and/or provide notice for when particular events occur. Continuing with the example, the listener may capture events and provide notice for positioning a cursor over a particular element of the user interface, removing a cursor position from hovering over a particular element, any other movements of a user interface indicator, and/or interactions with the user interface. When a particular type of event is captured, the listener for the particular type of event may receive notice of the occurrence, thereby allowing for detection of the particular type of event, such as a first positioning of a cursor within the target region.

Those with skill in the art will recognize that there are many implementations for detecting the entry/positioning of the cursor or other indicator into a defined target region. For example, the current location of a cursor may be continually checked to determine if the cursor is in the target region, and if the cursor is in the target region, the positioning may trigger a response.

In some embodiments, positioning events may be defined with rules, such as rules requiring detection of a particular motion, a series of motions, a movement at a particular speed and/or velocity, a movement in a particular direction, hovering a cursor over a particular region of a user interface, and/or any combination thereof. Any definition or rule may define what constitutes a positioning event that may be detected and allow for a response. In some embodiments, artificial intelligence may be used to determine, learn, and/or help define what constitutes a movement for a particular individual. For example, artificial intelligence may be used to learn that a slight movement of an individual detected by a motion detector may constitute enough movement to position a cursor within a target region and represent a request to invoke display of the user interface element.

The target region may be designed and/or configured to be any portion of the user interface and/or display. For example, the target region may be defined to be in a particular portion of the user interface, such as where a user interface element of the user interface may be located when displayed. In some embodiments, the target region may be an area defined with a document element of an HTML (hypertext markup language) file, such as a "div" document element. The target region may be defined to be larger than the area of the display for the user interface element to allow a user to overshoot or get near to the expected portion of the user interface for display of the user interface element. In some embodiments, the target region may have "dead space" areas that will not trigger a response. Areas of "dead space" may be defined to ensure that a user may interact with user interface elements located near the target region without triggering the display of the user interface element. In other embodiments, the target region may be smaller or the same size as the user interface element triggered to be presented on the display in response to the movement of the cursor into the target region. The target region may be highlighted to indicate the location for the target region visually. In particular embodiments, there may be no visual indicator on the user interface that the user interface element may be triggered for presentation within the user interface, and the user interface element may appear on the user interface as an option to the user for display within the user interface.

The user interface element may be a panel, a menu, a user interface element with user controls, a widget, and/or any other user interface element desired for display. In one embodiment, the user interface element is a panel having a menu of predefined markup language patterns available for user selection for insertion into the electronic content work presented in one or more of a preview panel and a code view panel of the user interface.

Responsive to the first positioning, a user interface element may be presented on at least a portion of the user interface with at least one user interface control (104). For example, a panel or a portion of the panel may be presented on/in the user interface to indicate to the user that the panel is an option for display and the amount of space on the display that the panel may occupy. The user interface element may be displayed as an overlay over the user interface without causing readjustment or shifting of other user interface elements on the user interface. For example, the user interface element may be displayed "absolutely" using a cascading style sheet (CSS) and appear over and cover at least a portion of the user interface with out disrupting the display of the underlying user interface. By overlaying the user interface element onto the user interface, a user may view the content provided with the user interface element and the amount of space that the user interface element may occupy within the user interface, if incorporated, without disturbing other elements on the underlying user interface.

The overlaid user interface element may be presented over the user interface and cover a portion of the user interface. In some embodiments, a portion of a panel or a tab may be overlaid onto the user interface to indicate to the user that the user interface element is an option for display. For example, a tab/icon representing the user interface element may be overlaid as a reminder of the option to incorporate the user interface element to remind the user of the existence of the user interface element for incorporation in subsequent positioning of the user interface indicator into the target region, after the user interface element has been initially displayed. Optionally, the user interface element may be presented/overlaid as an option for display within the user interface for a predefined length of time.

In some embodiments, the user interface element may be gradually, incrementally overlaid onto the user interface. For example, in timed increments, portions of the user interface element may be gradually be overlaid onto the user interface, so as to appear as if the panel is gradually sliding out from the outer edge of the user interface toward the center of the user interface. Continuing with the example, portions of the user interface element may be overlaid in 10 ms time increments and each overlaid portion may be an increase in size from the last portion until the entire user interface element is overlaid onto the user interface. Those with skill in the art will recognize that there are other animation techniques that may be used to overlay/present the user interface element gradually, so as to not abruptly disturb the user with the display of the user interface element.

The at least one user interface control may be displayed with the user interface element and allow the user to provide selection input of incorporation options for the user interface element. The user interface control may be any type of user interface control that allows for input of selection/deselection of an incorporation option, including, but not limited to the following: a radio button, an icon, a sliding bar to indicate the length or width of the element to be displayed, and/or any other user interface control. By way of example, the user interface control may be an icon that may be selected to indicate that the user interface element should be incorporated into the user interface and/or deselected to indicate the user interface element should not remain incorporated in the user interface. Input of the incorporation option is meant to be construed broadly to encompass both actively providing input to select/deselect an option as well as not actively providing input and allowing the user interface control to remain deselected indicating an option.

The incorporation option may include, but is not limited to, the following: option to remain displayed, option to display more and/or less of the user interface element, option to display element for a set period of time, option to shift and/or resize other user interface elements to incorporate the user interface element, option to resize user interface element for incorporation, any other incorporation option for the user interface element and/or combination thereof. In a particular embodiment, the default operation for the user interface may be for the user interface element to be overlaid onto the user interface as an element to incorporate and is removed from the user interface, if the user does not actively select that the user interface element be incorporated using the user interface control. In some embodiments, the user may be provided with a user interface control to minimize the user interface element. In other embodiments, if the user interacts with any user interface controls within the user interface element, then the user interface control may be automatically selected for incorporation into the user interface.

The user interface may be incorporated into the user interface and presented to the user in accordance with the selection/deselection of the user interface control (106). The user interface element overlay may be removed and the element may be incorporated into the user interface in accordance with received incorporation input. For example, the elements may be shifted over and resized to accommodate the additional user interface element. Animation may be used to ensure a gradual change in the user interface to incorporate the user interface element, and the removal of the overlayed user interface element. In another example, the user interface element overlay may be removed and the element may not be incorporated, when no incorporation input is received.

In some embodiments, a second positioning of the user interface indicator away from the overlaid user interface element may be detected. An input of a second movement may be received that positions the user interface indicator away from the overlaid user interface element may be detected. The user may provide input that directs the user interface indicator away from the overlaid user interface element. For example, the cursor may be positioned on or substantially near to the user interface element, when the user interface element is overlaid onto the user interface, and when the user moves the user interface indicator away from the overlaid user interface element, the movement may be detected. Responsive to the second positioning, the overlaid user interface element may be removed after a period of time. For example, the overlaid user interface element may be removed from the user interface after 700 ms to give the user time to move their mouse back onto the panel before the panel is removed or minimized.

Rules may be defined to differentiate the first positioning from the second positioning. By way of example, an amount of time may need to elapse between the first and the second movement to position the cursor. In another example, the first positioning may be defined to be a different type of movement from the second positioning. For example, the movement qualifying as the second positioning may be slight as compared to the movement required for the first positioning into the target region.

Those with skill will recognize that there may be many implementations for the user to indicate to process received incorporation input in addition to or instead of receiving input to move the user interface indicator away from the overlaid user interface element. For example, the user may explicitly select a user interface control, another target area, and/or another element of the user interface to process the incorporation input received.

In some embodiments, a cursor or other user interface indicator may not be displayed to indicate a current location within the user interface. For example, a user may have a touchscreen and/or a motion detector/controller input device and may indicate a position on the display by a first action of touching a location or otherwise indicating a location within the user interface. In such cases, a first action may be defined to designate a location within a user interface where the user interface element is expected and/or may be presented to the user. By way of example, a user may touch and/or long press on a particular location for a period of time. In another example, a user may hover over a location or point toward a particular location that is detected by a motion detector. Here again, the target region may be defined as a region within or near where a user interface element can be displayed within the user interface. In some embodiments, the target region may be a side bar element within the user interface. The user may not have to select any particular icon and/or drag any particular icon or user interface element for the user interface element to indicate a position and invoke the display of the user interface element.

Figure 1B:
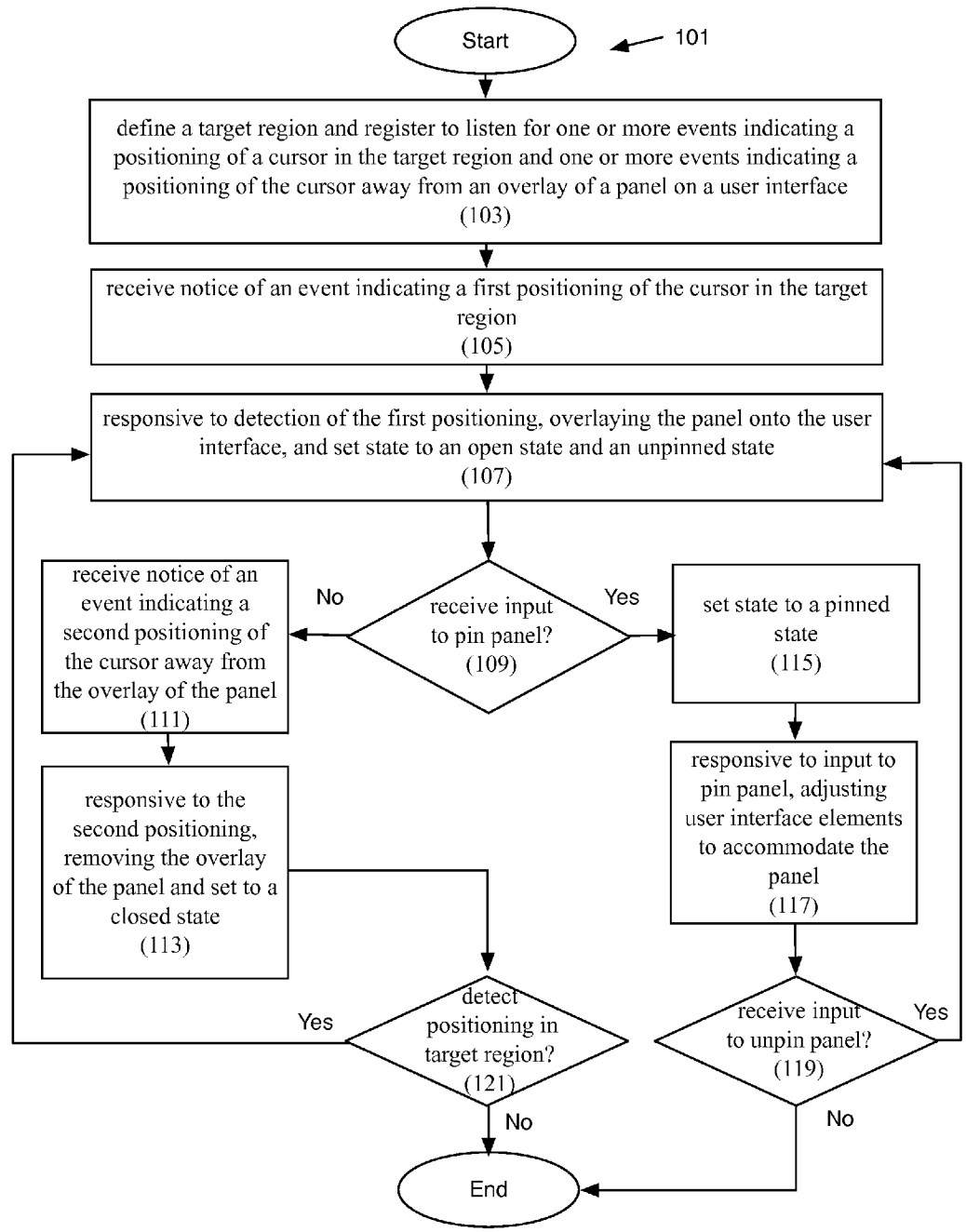
FIG. 1B is a flowchart depicting an exemplary process for management of user interface elements in accordance with some embodiments of the invention.

FIG. 1B is an exemplary flowchart depicting a process 101 for management of user interface elements in accordance with some embodiments of the invention. A target region may be defined (103). The target region may be defined by creating an HTML document with one or more document elements (e.g., delineated with markup tags) and instantiating an event listener to listen for input received that positions a cursor within over/within a defined document element (i.e., the target region) and/or outside of the document element. In some embodiments, an API for the browser may be used to create an event listener for capturing the event of positioning a cursor within a document element of a user interface (e.g., an area between "<div></div>" markup tags, an entire document between "<html></html>" markup tags, etc.), and providing notice for captured events. Pseudocode for an example of defining a target region is provided, as follows:

```
<div class="{{#if isPinned}}pinned{{/if}}">
<div class="hover-bar">
{{! These deadzones are used to filter mouse events and
    prevent the user interface element from opening if the
    user mouses over them, rather than the hover bar
    itself.}}
    <div class="hover-bar-deadzone"></div>
    <div class="icon"></div>
    <div class="hover-bar-deadzone deadzone-bottom"></div>
```

```
</div>
<div class="content">
</div>
</div>
```

As shown in the pseudocode, a "hover bar" on the user interface has a target region "<div class="content"></div>." The "hover bar" has dead zones (e.g., as shown with "<div class="hover-bar-deadzone"></div>" and "<div class="hover-bar-deadzone deadzone-bottom"></div>") to ensure that a user is able to access/click a neighboring icon that is positioned near the target region. In this case, as will be described in reference to FIG. 2, the dead zones insulate an icon 206 to the left of the hover bar to allow the icon 206 to be accessed without triggering the display of the panel. Inheritance rules, such as those used for cascading style sheets (CSS), may ensure that the target region does not inherit the functionality as defined for the ancestors (e.g., parent, sibling relationships) of the target region within the hover bar document element.

An event listener may be instantiated and may provide notice as to a mouse entry, hover, and/or exit within the target region. Notice may be received from the event listener upon receipt of input that moves a cursor to a position within a target region to detect the positioning of the cursor in the target region (105). A user may use an input device to move the cursor into the target region, and responsive to the cursor movement, a panel may be overlaid onto at least a portion of the user interface (107).

A state may be set to indicate the present condition for the user interface element. When the panel is overlaid onto the user interface, the state may be set to "open" to indicate that the panel is displayed and "unpinned" to indicate that the panel is not yet incorporated in the user interface (107). The panel may be overlaid onto the user interface to show the user the content on the panel available to be incorporated within the user interface and the amount of space that the panel may occupy, when incorporated within the user interface.

If no input is received indicating to pin the panel to the user interface (109) and notice is received for an event for a cursor movement away from the overlay of the panel (111), then the overlay of the panel is removed (113). The state for the user interface element state may be set to a closed state to indicate that the overlay of the panel is removed. If notice of an event indicating a positioning of the cursor within the target region again (121), then the process repeats starting at (107). If no notice of an event indicating the positioning the cursor within the target region (121), then the process ends.

Alternatively, if input is received indicating to pin the panel (109), then the state is set to a pinned state (115). The user may select the user interface control to designate to incorporate the panel into the user interface. The user interface elements may be adjusted to accommodate the panel and the overlaid panel may be removed. Hereagain, the overlaid panel may be gradually removed from the user interface so as not to be an abrupt change that is disruptive to the user. User interface elements may be gradually shifted over and/or resized to accommodate the size of the panel. In some embodiments, CSS animation may be used to gradually shift over, resize, and/or adjust user interface elements to accommodate the user interface element.

If input is received to unpin the panel by deselecting the user interface control for incorporation of the panel (119), the panel may be overlaid onto the user interface (105) and the process may repeat.

Figure 2:
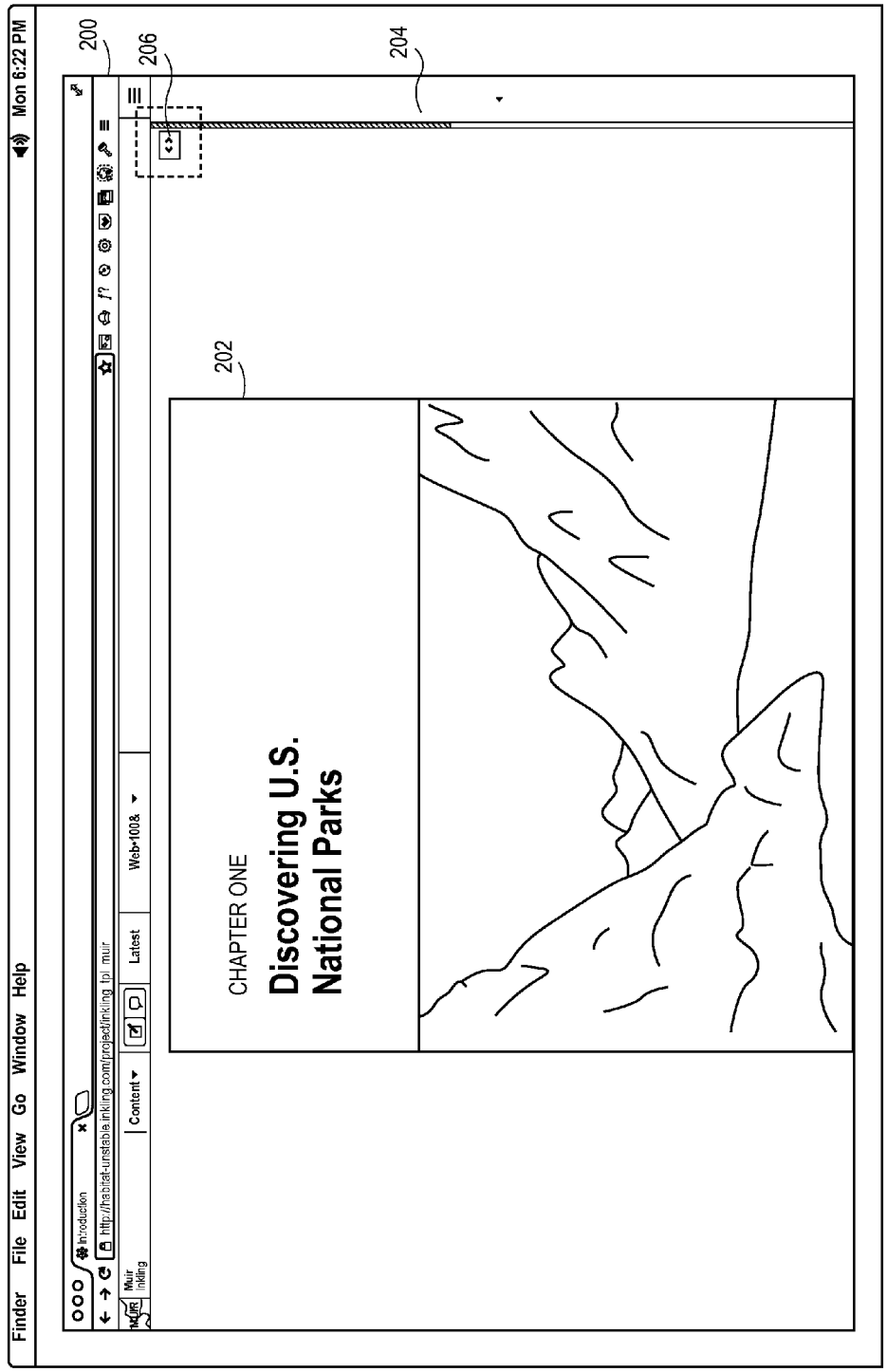
FIG. 2 is an exemplary user interface for management of user interface elements in accordance with some embodiments of the invention.

FIG. 2 is an exemplary user interface 200 for management of user interface elements in accordance with some embodiments of the invention. In FIG. 2, the user interface 200 is depicted for a software tool with a single panel 202 presented on the display. By way of example, the user interface 200 may be a content work that may be edited and/or created with the software tool. As shown, in this example, the target region is delineated within the user interface with a sidebar 204 (e.g., div class hover-bar). In other embodiments, there may be no area delineated and no particular icon to indicate that the user interface element may be presented. In some embodiments, the target region may be delineated to the user with particular shading and/or other visual indicator for the target region.

One or more deadzones may be provided to allow a user to access icon 206 without causing the user interface element to be presented on the user interface. The following figures will illustrate the changes in the display from movements, actions, and selection/deselection of user interface controls for visibility of user interface elements.

Figure 3:
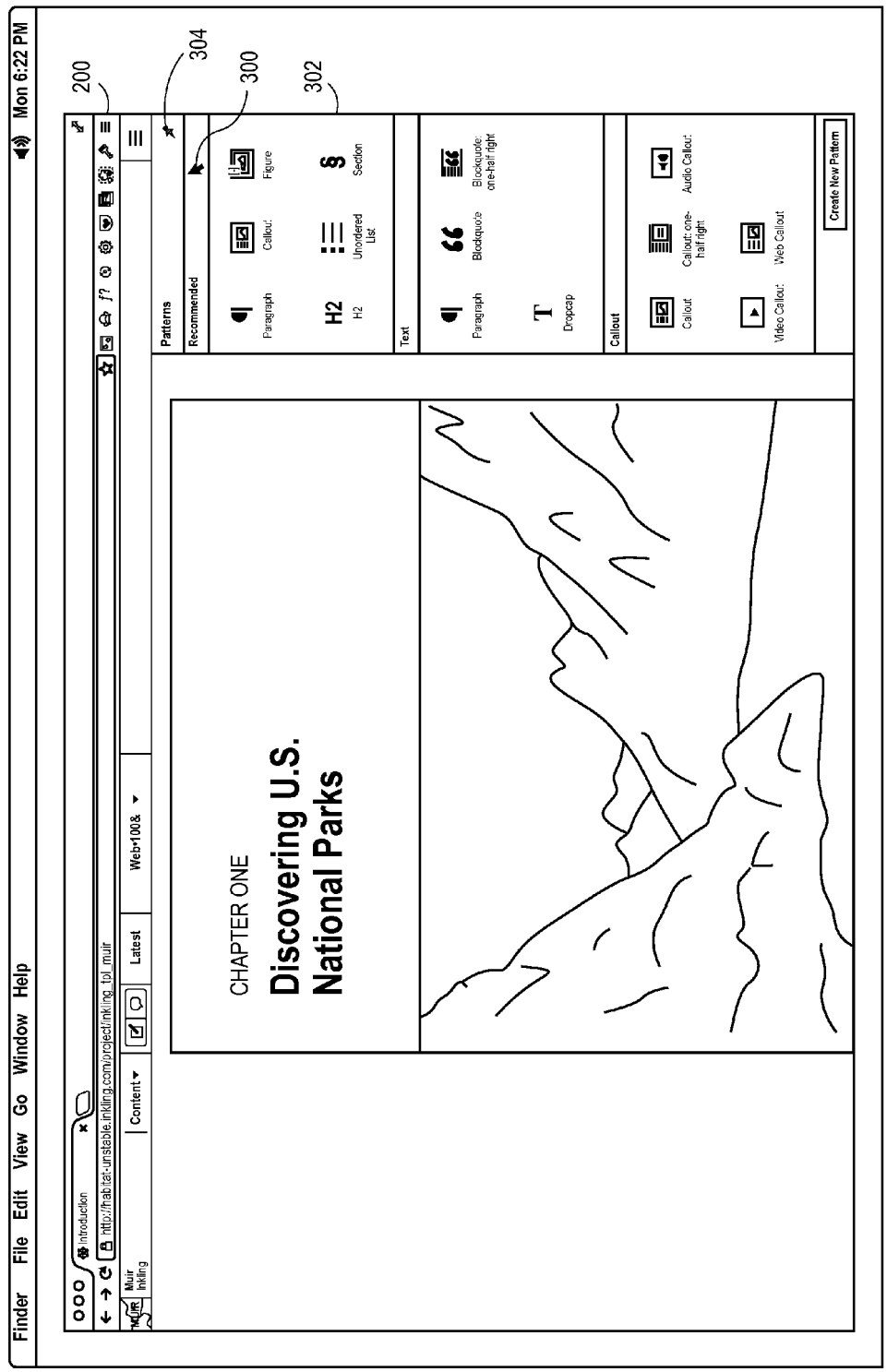
FIG. 3 is an exemplary user interface for management of user interface elements in accordance with some embodiments of the invention.

FIG. 3 is an exemplary user interface for management of user interface elements in accordance with some embodiments of the invention. As depicted in FIG. 3, a first movement of the cursor 300 into a target region of user interface 200 triggers the overlay of a user interface element, in this example a menu panel 302. The user is able to trigger the presentation of the menu panel without having to select or click an icon, and the movement into the target region alone, in this example, triggers the display of the menu panel 302. The menu panel 302 has an icon user interface control 304 that allows for the selection for the menu panel 302 to be incorporated into the user interface 200 and deselection of icon 304 may indicate for the menu panel to be removed from the display. In some embodiments, a color variation may indicate whether the user interface control 304 has been selected (bold color) or deselected (as shown with a patterned icon). Those with skill in the art will recognize that there are many implementations for indicating to the user visually that a user interface control is selected/deselected. For example, in one embodiment, there may be user interface controls for preventing the overlay of the menu panel onto the user interface for the particular menu panel for a period of time and/or for the duration of the particular session with the web application.

Figure 4:
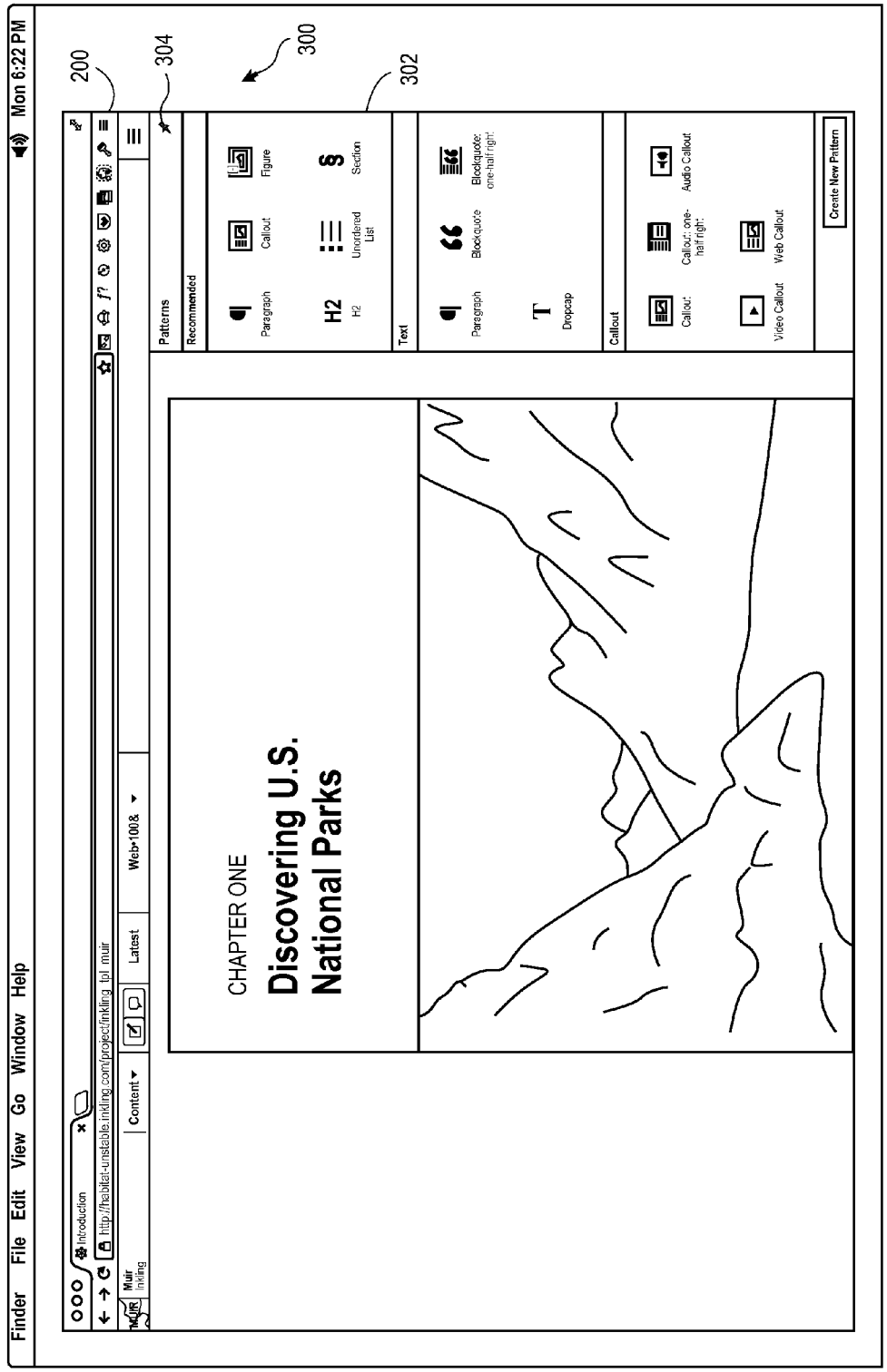
FIG. 4 is an exemplary user interface for management of user interface elements in accordance with some embodiments of the invention.

FIG. 4 is an exemplary user interface for management of user interface elements in accordance with some embodiments of the invention. As shown in FIG. 4, a user may overshoot or move the cursor just past the area on the display where the user interface element 302 may appear on the user interface 200, and the target region may be defined to encompass an area that extends past the display area occupied by the menu panel 302 on the user interface to account for just missing the target region and allow for display of the menu panel 302 in response to the movement. Continuing with the example, the user interface element may be overlaid on onto the user interface even when the user overshoots the area on the display where the user interface element may be presented to the user. In other embodiments, the user may have a period of time (e.g., 30 seconds) to return to the target region after moving the cursor outside the target region.

Figure 5:
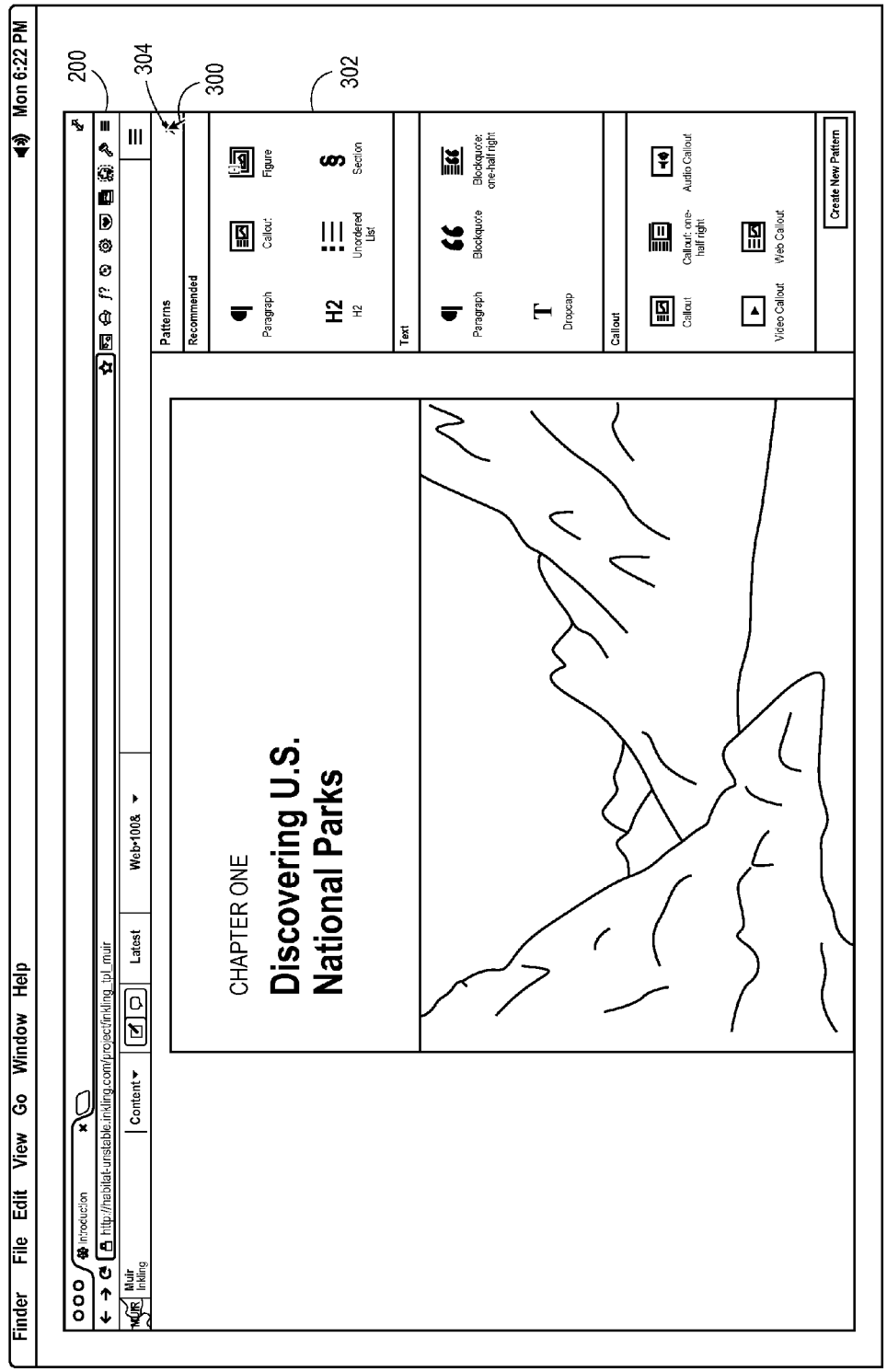
FIG. 5 is an exemplary user interface for management of user interface elements in accordance with some embodiments of the invention.

FIG. 5 is an exemplary user interface for management of user interface elements in accordance with some embodiments of the invention. As depicted in the user interface 200, the user may select user interface control 304 to indicate the menu panel 302 should be incorporated into the user interface 200 even after the cursor 300 is moved off of/away from the menu panel 302.

Figure 6:
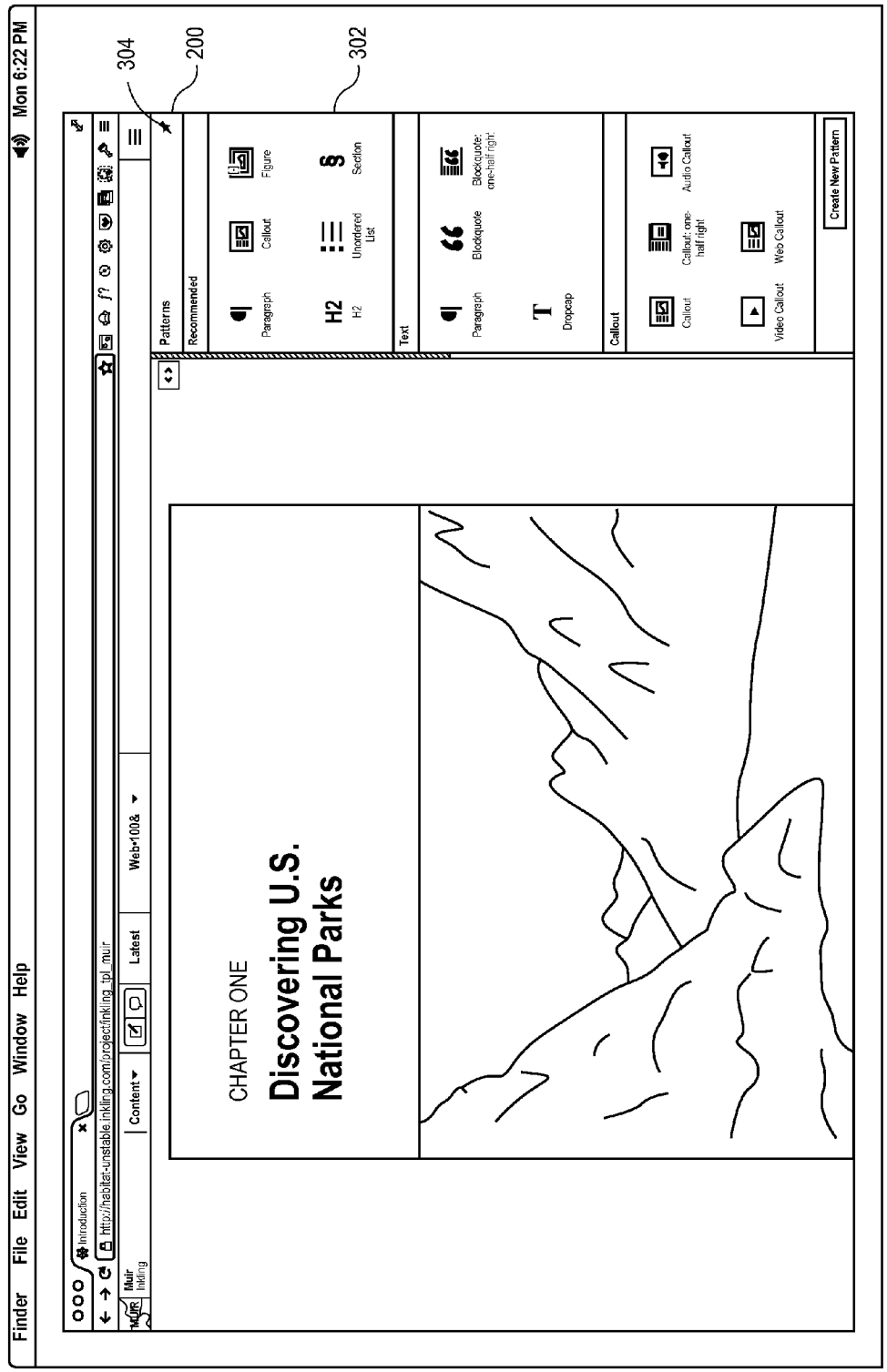
FIG. 6 is an exemplary user interface for management of user interface elements in accordance with some embodiments of the invention.

FIG. 6 is an exemplary user interface for management of user interface elements in accordance with some embodiments of the invention. As depicted, the menu panel 302 may be incorporated into the user interface 200 in accordance with the selected user interface control 304, regardless of the position of cursor. The user interface elements may be shifted over to accommodate the new panel. As shown, user interface elements and icons that were underneath the overlaid panel may be shifted over to provide for the incorporation of the menu panel 302.

Figure 7:
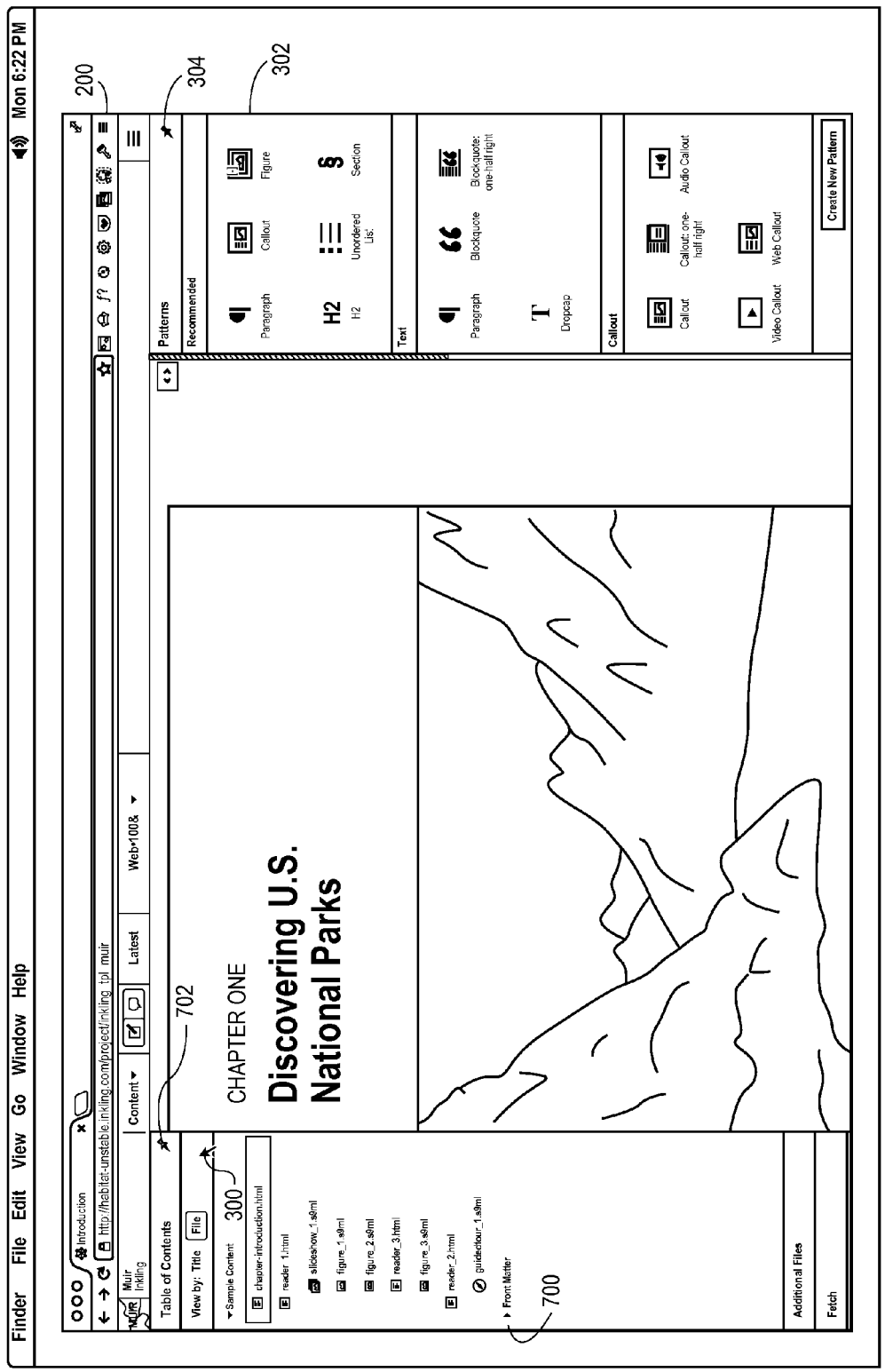
FIG. 7 is an exemplary user interface for management of user interface elements in accordance with some embodiments of the invention.

FIG. 7 is an exemplary user interface for management of user interface elements in accordance with some embodiments of the invention. As depicted in user interface 200, a user may move the cursor 300 (depicted with a pointer arrow) into another target region of the user interface and, as a result, another menu (depicted as a navigation menu panel 700) may be overlaid onto the user interface 200. A user interface control 702 is provided for the user to select/deselect visibility for the navigation menu panel 700.

Figure 8:
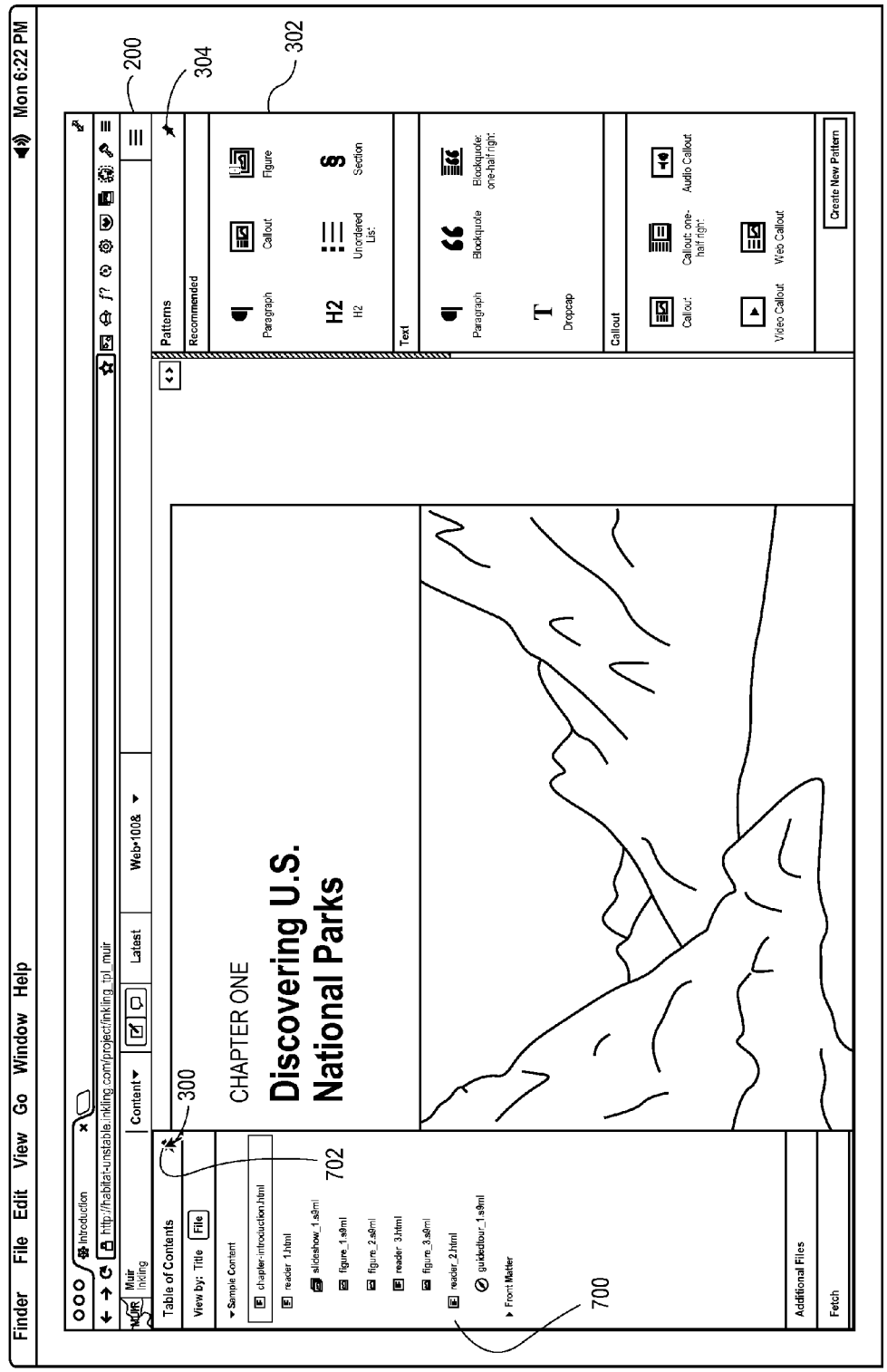
FIG. 8 is an exemplary user interface for management of user interface elements in accordance with some embodiments of the invention.

FIG. 8 is an exemplary user interface for management of user interface elements in accordance with some embodiments of the invention. As shown, the user may select the user interface control 702 to ensure the navigation menu panel 700 is incorporated into the user interface 200.

Figure 9:
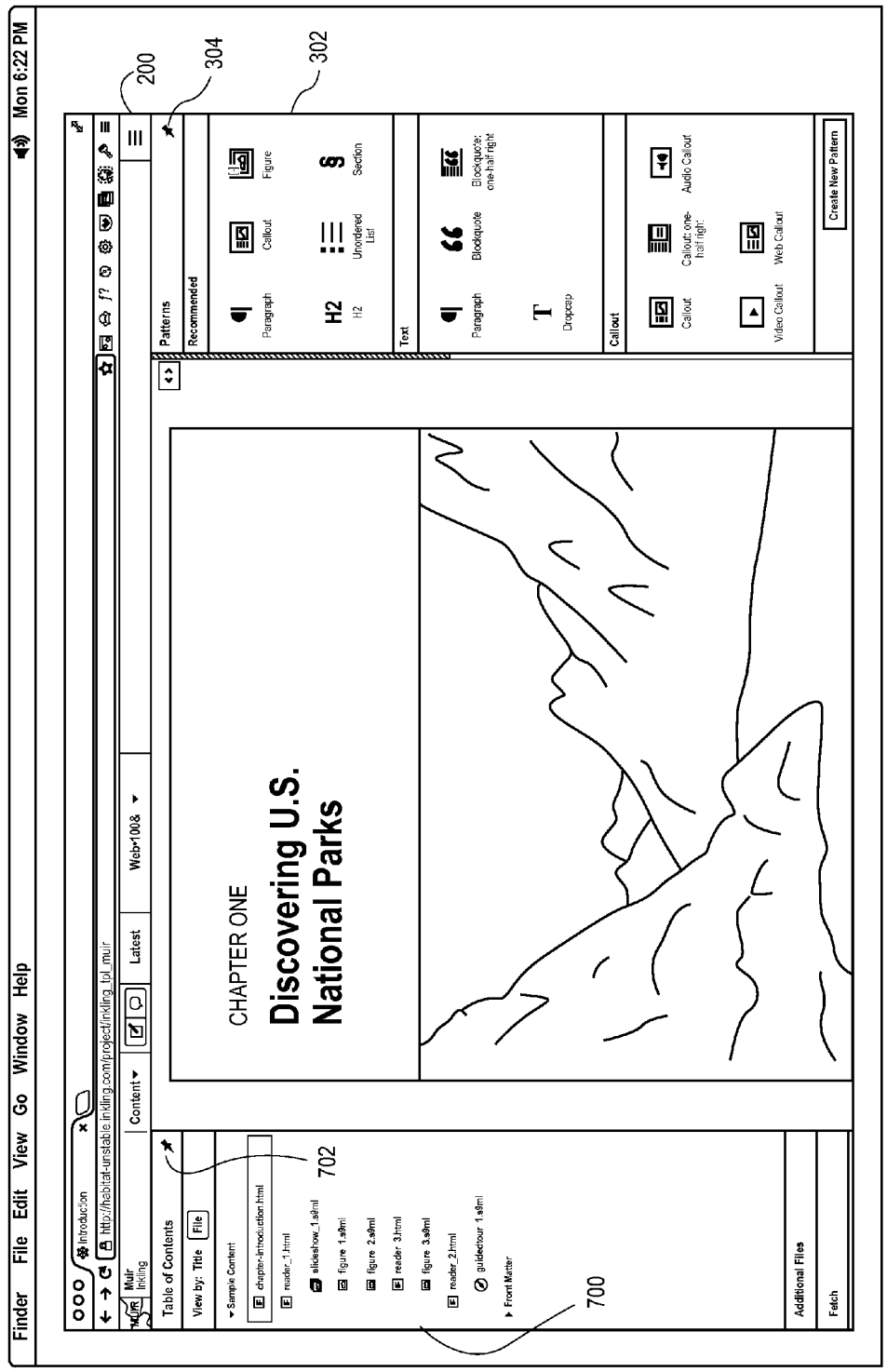
FIG. 9 is an exemplary user interface for management of user interface elements in accordance with some embodiments of the invention.

FIG. 9 is an exemplary user interface for management of user interface elements in accordance with some embodiments of the invention. As shown in FIG. 9, when the user moves the cursor away from the navigation menu panel 700, the user interface elements are shifted over to incorporate the navigation menu panel 700 into the user interface 200.

Figure 10:
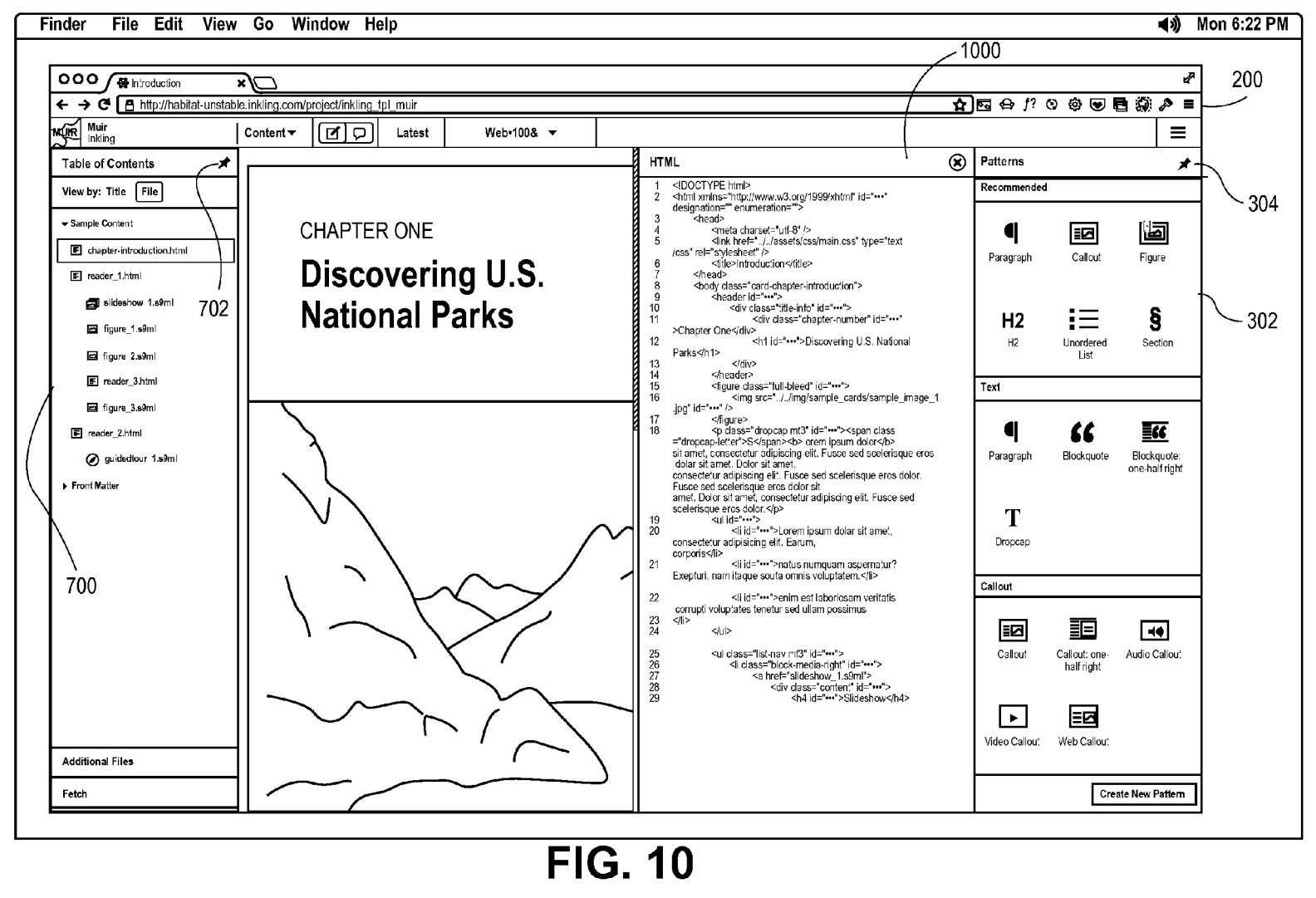

FIG. 10 is an exemplary user interface for management of user interface elements in accordance with some embodiments of the invention. As shown in FIG. 10, the panel selected to be incorporated into the user interface 200 even with the addition of a code view panel 1000. The code view panel provides a user a view of the source HTML for the electronic work displayed in preview panel 202.

Figure 11:
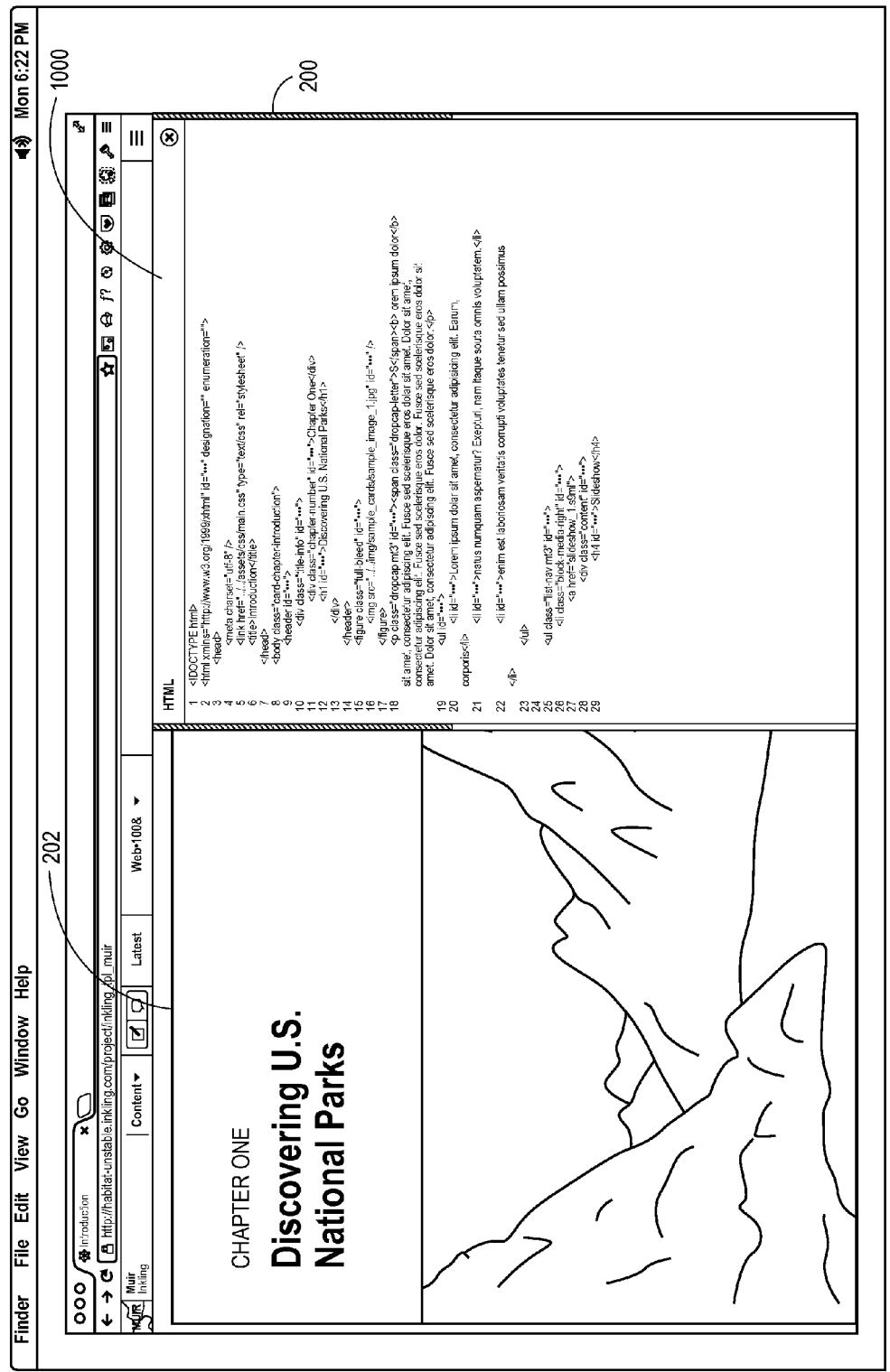
FIG. 11 is an exemplary user interface for management of user interface elements in accordance with some embodiments of the invention.

FIG. 11 is an exemplary user interface for management of user interface elements in accordance with some embodiments of the invention. FIG. 11 illustrates the preview panel 202 and the code view panel 1000 without the user interface elements that may be optionally selected/deselected as visible within the user interface 200.

Within the present methods and systems, several enhancements can be made. For example, in one embodiment of the invention, slider bar user interface controls may be provided to allow the user to select the amount (e.g., the width of) the menu panel that should remain displayed on/in the user interface 200.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Further the procedures described herein may involve the use of various computer systems and computer readable storage media having computer-readable instructions stored thereon. FIG. 12 provides an example of a computer system 1276 that is representative of any of the computer systems or electronic devices discussed herein. Note, not all of the various computer systems may have all of the features of computer system 1276. Computer systems such as computer system 1276 may be referred to by other names, for example as hand-held devices, mobile devices, smart phones, multi-processor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention. The computer-readable instructions may be rendered in any computer language including, without limitation, C#, C/C++, assembly language, markup languages (e.g., HTML, SGML, XML, VoXML), Javascript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

FIG. 13 illustrates a computer system 1276 from the point of view of its software architecture. Computer system 1276 may be any of the electronic devices or, with appropriate applications comprising a software application layer 1196, may be a computer system for use with the publishing tool described herein. The various hardware components of computer system 1276 are represented as a hardware layer 1198. An operating system abstracts the hardware layer and acts as a host for various applications 1202a-1202m, that run on computer system 1276. The operating system may host a web browser application 1206, which provides access for the publishing tool, etc.

Thus, methods and systems for converting content created by software tools, for example desktop publishing tools, in formats intended for use with print-based distributions of the content to formats suitable for use in connection with digital distributions of the content have been described.

What is claimed is:

1. A method comprising:
presenting one or more of a preview panel and a code view panel within a user interface, wherein the user interface is additionally configured to display a pattern menu panel permitting selection from a menu of pre-defined markup language patterns, and a navigation menu panel;
detecting a first positioning of a user interface indicator corresponding to the user interface indicator entering and remaining within a target region of the user interface, the target region containing at least one dead zone, such that the first positioning is located outside the at least one dead zone, wherein a dead zone is a prescribed area at least partially within the target region that cancels the effect that is otherwise responsive to the user interface indicator entering and remaining in the target region when the user interface indicator is positioned within the target region and the dead zone;
responsive to the first positioning, overlaying at least a portion of a user interface element that is the pattern menu panel or the navigation menu panel onto the user interface and presenting, on the user interface element, a user interface control for causing the user interface element to remain displayed at the same location if the user interface control is selected; and
presenting the user interface based on whether the user interface control is selected.

2. The method of claim 1, wherein the user interface control has not been selected, further comprising:
detecting a second positioning of the user interface indicator away from the overlaid user interface element; and
responsive to the second positioning, removing the overlaid user interface element.

3. The method of claim 1, further comprising, responsive to selection of the user interface control: (1) shifting user interface elements within the user interface to incorporate at least a portion of the panel, (2) minimizing one or more user interface elements to incorporate the at least a portion of the panel, (3) reorganizing user interface elements within the user interface to incorporate the at least a portion of the panel, or (4) resizing user interface elements within the user interface to incorporate the at least a portion of the panel.

4. The method of claim 1, further comprising:
receiving input for positioning of the user interface indicator on a display from an input device, the user interface indicator comprising a cursor, and the input device comprising at least one of: a mouse, a touchscreen, a motion detector, and a stylus.

5. The method of claim 1, the method further comprising:
receiving input to select the user interface control; and
shifting one or more other user interface elements within the user interface during a plurality of defined time increments to accommodate a width of the user interface element.

6. The method of claim 5, the method further comprising:
receiving input to remove the selection of the user interface control;
shifting one or more other user interface elements within the user interface during a plurality of defined time increments to utilize the space within the user interface upon the removal of the user interface element; and
presenting the user interface without the user interface element.

7. The method of claim 1, the method further comprising:
registering with an event listener to receive notice of a first event of a movement of the user interface indicator into a target region and a second event of a movement away from the overlaid user interface element, wherein detecting the first positioning and a second positioning of the user interface indicator comprises receiving notice of the first and second events from the event listener.

8. The method of claim 1, further comprising:
responsive to selection of the user interface control, reorganizing or resizing one or more other user interface elements that were at least partially obscured by the overlaid user interface element, such that the one or more other user interface elements are no longer obscured by the overlaid user interface element.

9. A non-transitory computer readable medium storing computer-executable instructions, which instructions when executed by a processor cause the processor to perform steps comprising:
   presenting, on a display communicably coupled to the processor, one or more of a preview panel and a code view panel within a user interface of a content editing tool configured to permit a user to apply user-designated revisions to a markup language representation of an electronic content work, wherein the user interface is additionally configured to display a pattern menu panel permitting selection from a menu of predefined markup language patterns, and a navigation menu panel, and
   responsive to detecting a first positioning of a user interface indicator corresponding to the user interface indicator entering and remaining within a target region within the user interface, the target region containing at least one dead zone, such that the first positioning is located outside the at least one dead zone, wherein a dead zone is a prescribed area at least partially within the target region that cancels the effect that is otherwise responsive to the user interface indicator entering and remaining in the target region when the user interface indicator is positioned within the target region and the dead zone, overlaying:
      a user interface element that is the pattern menu panel or the navigation menu panel onto the user interface, and
      a user interface control on the user interface element, wherein the control is for causing the user interface element to remain displayed at the same location if the user interface control is selected; and
   presenting the user interface based on whether the user interface control is selected.

10. The non-transitory computer readable medium of claim 9, wherein the instructions further cause the processor to adjust the user interface to incorporate the user interface element within the user interface responsive to user selection of the user interface control, wherein adjusting the user interface comprises at least one of: (1) shifting user interface elements within the user interface to incorporate at least a portion of the panel, (2) minimizing one or more user interface elements to incorporate the at least a portion of the panel, (3) reorganizing user interface elements within the user interface to incorporate the at least a portion of the panel, and (4) resizing user interface elements within the user interface to incorporate the at least a portion of the panel.

11. The non-transitory computer readable medium of claim 9, wherein, responsive to user selection of respective user interface controls associated with each respective user interface element of a plurality of user interface elements, the instructions further cause the processor to cause each of the plurality of user interface elements to remain displayed at the same location if the respective user interface control is selected even after the user interface indicator is moved off of respective ones of the overlaid user interface elements.

12. The non-transitory computer readable medium of claim 9, wherein while rendered within the user interface, the electronic content work is presented so that both readable previews and source code views of the electronic consent work are visible.

13. The non-transitory computer readable medium of claim 9, wherein the instructions further cause the processor to present, responsive to detecting a second positioning of the user interface indicator into a second target region within the user interface, the second target region containing at least a second dead zone, such that the second positioning is located outside the second dead zone, a second user interface element in at least a second portion of the user interface and a second user interface control on the second user interface element for causing the second user interface element to remain displayed at the same location if the user interface control is selected.

14. A computer system comprising a display and a processor configured to present a user interface on the display, the user interface comprising:
   a first panel for displaying a preview view of an electronic content item;
   a second panel, presentation of which is subject to user selection, for displaying a code view of the electronic content work; and
   one or more user interface elements selected from: a pattern menu panel permitting selection from a menu of predefined markup language patterns, and a navigation menu panel; presentation of each of which within the user interface is responsive to detection of a respective positioning of a user interface indicator within a respective target region of the user interface wherein each respective positioning corresponds to the user interface indicator entering and remaining within the respective target region that contains at least one dead zone, such that the respective positioning is located outside the at least one dead zone, wherein presentation of each respective user interface element is accompanied by presentation of at least one respective user interface control on the user interface element for causing the respective user interface element to remain displayed at the same location if the respective user interface control is selected.

15. The computer system of claim 14, wherein at least one of the user interface elements is a panel having a menu of predefined markup language patterns available for user selection for insertion into the electronic content work presented in the first or second panel of the user interface.

16. A method comprising:
   detecting an input indicative of selecting a first position within a target region of a user interface including one or more of a preview panel and a code view panel within a user interface, wherein the user interface is additionally configured to display a pattern menu panel permitting selection from a menu of predefined markup language patterns, and a navigation menu panel, the target region containing at least one dead zone, such that the first positioning is located outside the at least one dead zone, wherein a dead zone is a prescribed area at least partially within the target region that cancels the effect that is otherwise responsive to the input indicative of selecting a first position located within the target region when the first position is positioned within the target region and the dead zone; and
   responsive to the first position selection, overlaying at least a portion of a user interface element that is the pattern menu panel or the navigation menu panel onto the user interface and presenting at least one user interface control on the user interface element for causing the user interface element to remain displayed at the same location if the user interface control is selected;

detecting an input indicative of selecting a second position on the user interface away from the overlaid user interface element; and responsive to the second position selection, presenting the user interface without the overlay.

17. A server, comprising:

an interface for receiving a request from a client for presentation of a user interface for presenting one or more of a preview panel, a code view panel, a pattern menu panel permitting selection from a menu of predefined markup language patterns, and a navigation menu panel, the request indicative of (1) received input at the client on a first positioning of a user interface indicator within a target region of the user interface presented on the client, the first positioning corresponding to the user interface indicator entering and remaining within the target region, and the target region containing at least one dead zone, such that the first positioning is located outside the at least one dead zone, wherein a dead zone is a prescribed area at least partially within the target region that cancels the effect that is otherwise responsive to the user interface indicator entering and remaining in the target region when the user interface indicator is positioned within the target region and the dead zone, and (2) received input at the client regarding whether to cause an interface element to remain displayed at the same location; and a processor configured to respond to the client request with a determination on:

(1) whether the client presents the user interface with an overlay of at least a portion of the user interface element and a user interface control on the user interface element for causing the interface element to remain displayed at the same location if the user interface control is selected, and (2) whether the client presents the user interface with or without the user interface element based on the received input at the client regarding whether to cause an interface element to remain displayed at the same location.

18. The server of claim 17, the processor further configured to:

determine the user interface element based on the target region.

* * * * *